United States Patent
Kawaguchi et al.

(10) Patent No.: US 7,554,940 B2
(45) Date of Patent: Jun. 30, 2009

(54) MOBILE COMMUNICATION SYSTEM, METHOD OF CONTROLLING OPERATION THEREOF, AND NODE USED FOR THE SYSTEM

(75) Inventors: Kenji Kawaguchi, Tokyo (JP); Masahiko Kojima, Tokyo (JP); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 846 days.

(21) Appl. No.: 10/678,105

(22) Filed: Oct. 6, 2003

(65) Prior Publication Data

US 2004/0066774 A1    Apr. 8, 2004

(30) Foreign Application Priority Data

Oct. 7, 2002    (JP) .............................. 2002-293137

(51) Int. Cl.
*H04W 4/00* (2009.01)
*H04L 12/66* (2006.01)
*H04B 1/06* (2006.01)
*H04B 7/00* (2006.01)

(52) U.S. Cl. ........................ 370/328; 370/338; 370/352; 370/355; 370/356; 455/352; 455/466; 455/515

(58) Field of Classification Search ................. 370/328, 370/338, 352, 355, 356, 310.1, 310.2, 320, 370/329, 331, 396, 401, 400, 349; 455/352, 455/515, 466
See application file for complete search history.

(56) References Cited

U.S. PATENT DOCUMENTS 5,999,813 A * 12/1999 Lu et al. ................... 455/435.2
6,119,000 A * 9/2000 Stephenson et al. ...... 455/432.1
7,075,904 B1 * 7/2006 Manish et al. ............... 370/312

(Continued)

FOREIGN PATENT DOCUMENTS

EP    1 363 467 A2    11/2003

(Continued)

OTHER PUBLICATIONS

European Search Report dated Jan. 30, 2004.

(Continued)

*Primary Examiner*—Chi H Pham
*Assistant Examiner*—Farah Faroul
(74) *Attorney, Agent, or Firm*—McGinn IP Law Group, PLLC

(57) ABSTRACT

In a mobile communication system, when a connection necessary to provide a service supporting high-speed data communication referred to as an MBMS (Multimedia Broadcast Multicast Service) is configured on an Iu interface, contention with the other packet communication service is eliminated. As a logical connection established between an SGSN (Serving GPRS (General Packet Radio Service) Support Node) and a Radio Network Controller in a Core Network 10, a PS (Packet Switching processing) functional connection for an existing packet communication service and a connection for a new MBMS service offering high-speed data communication are provided separately and independently from each other. This eliminates the contention between different types of services of the PS service and the MBMS service to thereby enable executing processings of such different types of services without being conscious of mutual processings. In addition, release processing of the connection may be executed independently to each service, thereby eliminating processing complexity in the SGSN.

60 Claims, 9 Drawing Sheets

U.S. PATENT DOCUMENTS

| | | | |
|---|---|---|---|
| 2001/0034231 A1* | 10/2001 | Palat et al. ................... | 455/433 |
| 2001/0038615 A1* | 11/2001 | Chang ........................ | 370/329 |
| 2002/0077105 A1* | 6/2002 | Chang ........................ | 455/436 |
| 2003/0063584 A1* | 4/2003 | Sayeedi ...................... | 370/331 |
| 2003/0091020 A1* | 5/2003 | Bantukul et al. ............ | 370/349 |
| 2003/0211855 A1* | 11/2003 | Sarkkinen et al. ........... | 455/466 |
| 2006/0166653 A1* | 7/2006 | Xu et al. .................. | 455/412.2 |

FOREIGN PATENT DOCUMENTS

| | | |
|---|---|---|
| JP | 2000-244507 | 9/2000 |
| JP | 2004-135260 | 4/2004 |

OTHER PUBLICATIONS

"MBMS with Iu-Flex", Announcement Samsung, XX, XX, May 6, 2002, , pp. 1-21, XP002252458.

"Ad-hoc on MBMS RNC signalling flows: Proposed update to R2-022601" 3GPP TSG-RAN WG2 meeting #32, R2-022699, 'Online!, Sep. 23-27, 2002, p. 1-4, XP-002264483.

Samsung: "Sharing Iu control bearer for MBMS" 3GPP TSG-RAN WG2 #32, Tdoc R2-022614, 'Online! Sep. 23-27, 2002, p. 1-2, XP-002264484.

Siemens, Nortel, Nokia: "MBMS architecture aspects" TSG-RAN Working Group 2 Meeting #32, R2-022644, 'Online! Sep. 23-27, 2002, p. 1-2, XP-002264485.

NEC: "Iu signalling Connection management 1-21 for MBMS multicast service" RAN Working Group 3 meeting #33, TSGR3#33(02)2418, 'Online! Nov. 11-15, 2002, p. 1-3 XP-002264486.

3 GPP TR 23.846 version 1.0.0. (Jan. 2002), Jul. 4, 2002, <URL:http://www.3gpp.org/ftp/Specs/archive/23_series/23.846/23846-100.zip>.

Japanese Office Action dated Jun. 26, 2007 (with partial English translation).

Japanese Office Action dated Mar. 14, 2006 with partial English translation.

Samsung, Sharing Iu control bearer for MBMS, TSG-RAN Working Group 2 Meeting #32, Sep. 23-27, 2002, R2-022614 <URLhttp://www.3gpp.org/ftp/tsg_ran/WG2_RL2/TSGR2_32/Docs/Zips/R2-022614.zip>.

Siemens, et al., MBMS architecture aspects, TSG-RAN Working Group 2 Meeting #32, Sep. 23-27, 2002, R2-022644. <http://www.3gpp.org/ftp/tsg_ran/WG2_RL2/TSGR_32/Docs/Zips/R2-022644.zip.

RRC Functions and Services provided to upper layers, Chapter 5, of the specification 3GPP TS 25.331 (Release 1999).

* cited by examiner

CONNECTION ESTABLISHMENT PROCESSING IN MBMS MULTICAST SERVICE

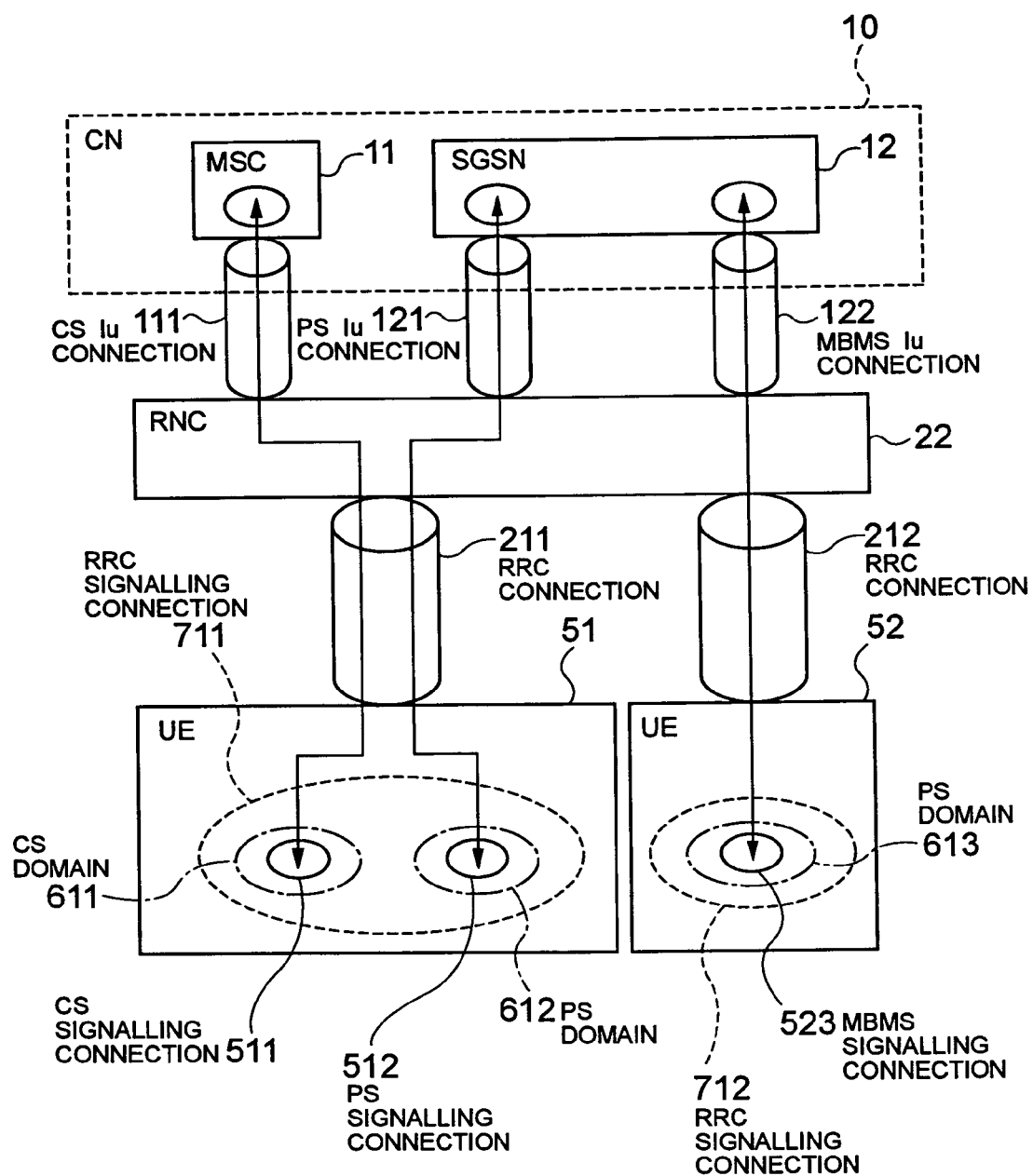

MOBILE COMMUNICATION SYSTEM, METHOD OF CONTROLLING OPERATION THEREOF, AND NODE USED FOR THE SYSTEM

BACKGROUND OF THE INVENTION

1. Field of the Invention

The present invention relates to a mobile communication system, a method of controlling operation thereof and a node used in the system, and more particularly, to a configuration system of a signalling connection on an interface between a Core Network and a Radio Network Controller (RNC), the signalling connection being necessary when providing a broadcast or multicast service supporting high-speed data communication called MBMS (Multimedia Broadcast Multicast Service) in the mobile communication system.

2. Description of the Prior Art

Techniques of configuring a signalling connection operable for transfer control of various control signals in a W-CDMA (Wideband-CDMA) mobile communication system are defined in "RRC Services provided to upper layers" in Chap. 5 of the specification TS 25.331 (Non-Patent Document 1) prepared by the 3GPP (Third Generation Partnership Project). By referring to FIG. 7, the signalling connection configuring techniques will be described.

It will be observed from FIG. 7 that the W-CDMA mobile communication system comprises a Core Network (CN) 10 including a switching network, a Radio Network Controller (RNC) 22, and a mobile terminal (UE) 51. Between the Core Network 10 and the Radio Network Controller 22, logical connections 111 and 121 are set for transfer of signalling messages, where the logical connection 111 is referred to as a CS Iu connection which is established between an MSC (Mobile-services Switching Center) 11 configuring the Core Network 10 and the Radio Network Controller 22, and is functional for a CS domain corresponding to a CS network having a circuit switching function for voice communication.

The logical connection 121 is referred to as a PS Iu connection which is established between an SGSN (Serving GPRS (Global Packet Radio Service) Support Node) 12 configuring the Core Network 10 and the Radio Network Controller 22, and is functional for a PS domain corresponding to a PS network having a packet switching function. The Radio Network Controller 22 manages radio resources, controls a Node B (radio base station) which is not shown, and the like, and is typified by a handover controlling device.

Established between the Radio Network Controller 22 and the mobile terminal 51 is an RRC (Radio Resource Connection) connection 211 for signalling transfer. The RRC connection 211 corresponds to an RRC signalling connection 711 in the mobile terminal 51. This RRC signalling connection 711 is configured with a CS signalling connection 511 for a CS domain 611 and a PS signalling connection 512 for a PS domain 612.

Thus, the W-CDMA mobile communication system makes it possible to establish in the mobile terminal 51 the signalling connections 511 and 512 corresponding to the CS domain 611 and the PS domain 612, respectively, which is defined in the Non-Patent Document 1.

The W-CDMA mobile communication system having such a configuration may sometimes support a new service such as MBMS (Multimedia Broadcast Multicast Service). More specifically, when a broadcast or multicast service called MBMS supporting high speed, large capacity data communication of moving images or images with sound information is provided, the W-CDMA mobile communication system takes a configuration shown in FIG. 8. FIG. 8 represents the case where the multicast service is provided.

In FIG. 8, the same reference numerals are allocated to the same components as those in FIG. 7. Referring to FIG. 8, there is shown a RAN (Radio Access Network) 21 provided between the Core Network 10 and the mobile terminals 51 to 53, which comprises the Radio Network Controller (RNC) 22 and a Node B 23. Note here that in FIG. 7 only the Radio Network Controller 22 is shown while the Node B 23 is omitted.

Within an MBMS coverage 41 where MBMS multicast service information is distributed, MBMS service subscribing mobile terminals 51 and 52 and a non-subscribing mobile terminal 53 are being present. Multicast is a service for distributing the same data to multiple specified destination addresses (mobile terminals).

In this case, the logical connections for signalling transfer between the Core Network 10 and the Radio Network Controller 22 are set as shown in FIG. 9. As seen from FIG. 9, when the CS signalling connection 511 of the CS domain 611 and the PS signalling connection 512 of the PS domain 612 are established in the mobile terminal 51, and when the mobile terminal 51 further attempts to receive the MBMS service in the current state, there is no need to execute another signalling connection establishment processing for the MBMS service to the mobile terminal 51. More specifically, since the MBMS service is provided in packet communication, an MBMS signalling connection may be regarded as being included in the PS domain having the packet switching function, whereby the mobile terminal 51 is able to use the PS Iu connection 121 which is an already established logical connection.

Thus, when the Iu connection for the PS domain has been established in the mobile terminal, the SGSN 12 does not execute paging processing in conformity with an RANAP (Radio Access Network Application Part) protocol (processing for recognizing one of a plurality of Radio Network Controller areas (cells) that a mobile terminal belongs to).

To the contrary, another mobile terminal 52, in which the signalling connection of the PS domain is not established, requires a new MBMS signalling connection 523 in order to receive the MBMS service and accordingly the SGSN 12 is requested to execute the paging processing. Reference numeral 613 denotes a PS domain of the mobile terminal 52, and 712 denotes an RRC signalling connection of the mobile terminal 52. Reference numeral 212 denotes an RRC connection between the mobile terminal 52 and the Radio Network Controller 22, and 122 denotes an MBMS Iu connection between the Core Network 10 and the Radio Network Controller 22.

As described by referring FIG. 9, if the PS signalling connection 512 for the PS domain is established in the mobile terminal 51 and further the logical connection of PS Iu connection 121 is established between the Core Network 10 and the Radio Network Controller 22 when the W-CDMA mobile communication system attempts to newly support the MBMS service, MBMS signalling may be performed using this PS Iu connection 121.

The signalling connection thus described is, however, shared with both the PS service including an existing packet switched service and such a new MBMS service, which raises the problem such that processing contention is caused between different types of services. More specifically, when an establishment request of a usual packet service (such as a receipt of packet data) is generated while the MBMS service is being provided, the paging processing is not executed because the PS signalling connection has already been established, but the signalling connection that is in use for the MBMS service works also for processing to establish an RAB (Radio Access Bearer) of the packet service. This is more likely to cause the processing contention between the MBMS service and the packet communication service.

Also, another problem may arise in that the processing in the SGSN 12 of the Core Network 10 increases in complexity. More specifically, if the mobile terminal has the established PS signalling connection for usual packet service, a message is transmitted/received using this existing PS signalling connection because of the mobile terminal being designed to have only one signalling connection in the PS domain. Therefore, a new PS signalling connection for the MBMS service does not need to be established. However, the mobile terminal not having the established PS signalling connection needs a new PS signalling connection to receive the MBMS service by which MBMS messages may be transmitted/received. This requires the SGSN to check into PS signalling establishment statuses of each mobile terminal and to determine the signalling connection used for message transmission and reception. Besides, even when the MBMS service is terminated, the SGSN needs to determine whether the mobile terminal is still receiving the usual packet service in order to perform release processing of the signalling connection if necessary.

It is, therefore, an object of the present invention to provide a mobile communication system in which an occurrence of contention between an existing packet communication service and a new MBMS service is eliminated, a method of controlling operations of the system, and a node used in the system.

Another object of the present invention is to provide a mobile communication system in which processing complexity in the SGSN is eliminated, a method of controlling operations of the system, and a node used in the system.

BRIEF SUMMARY OF THE INVENTION

A mobile communication system according to one embodiment of the present invention includes a core network having a node with a packet switching function for packet data communication, a radio network controller, and a mobile terminal, wherein a connection is set on an interface between the radio network controller and the node, and the mobile communication system is characterized by comprising connection setting means for setting the connection for multicast data communication faster than the packet data communication, separately from the connection for the packet data communication.

The mobile communication system is characterized in that the connection setting means sets the connection for the multicast data communication in common to a plurality of mobile terminals that attempt to receive a service of the multicast data communication, or sets the connection for the multicast data communication individually to each of the plurality of the mobile terminals that attempt to receive the multicast data communication service.

A method of controlling operations according to one embodiment of the present invention is a method of controlling operations in a mobile communication system including a core network having a node with a packet switching function for packet data communication, a radio network controller, and a mobile terminal, wherein a connection is set on an interface between the radio network controller and the node, and the method is characterized by comprising a connection setting step of setting the connection for multicast data communication faster than the packet data communication, separately from the connection for the packet data communication.

The connection setting step is characterized in that the connection setting step includes setting the connection for the multicast data communication in common to a plurality of mobile terminals that attempt to receive a service of the multicast data communication, or setting the connection for the multicast data communication individually to each of the plurality of the mobile terminals that attempt to receive the multicast data communication service.

A node according to one embodiment of the present invention is a node in a mobile communication system including a core network having a node with a packet switching function for packet data communication, a radio network controller, and a mobile terminal, wherein a connection is set on an interface between the node and the radio network controller, and the node in the mobile communication system is characterize by comprising connection setting means for setting the connection for multicast data communication faster than the packet data communication, separately from the connection for the packet data communication.

A program according to one embodiment of the present invention is a program for making a computer execute operation controlling of a node in a mobile communication system including a core network having a node with a packet switching function for packet data communication, a radio network controller, and a mobile terminal, wherein a connection is set on an interface between the node and the radio network controller, and the program is characterized by comprising a connection setting step of setting the connection for multicast data communication faster than the packet data communication, separately from the connection for the packet data communication.

According to the present invention, a PS (packet switched processing) functional signalling connection for an existing packet communication service and an MBMS connection for an MBMS (Broadcast/Multicast) service offering new high-speed data communication are provided separately and independently from each other, as a logical connection between the Core Network and the Radio Network Controller. This eliminates contention between different types of services such as the PS service and the MBMS service, thus resulting in successful processings of both different types of services without being conscious of mutual processings. In addition, release processing of the connection may be executed independently to each service, eliminating processing complexity of the SGSN.

BRIEF DESCRIPTION OF THE DRAWINGS

FIG. 9 is a diagram illustrating the case of receiving the MBMS multicast service in the configuration shown in FIG. 7.

DETAILED DESCRIPTION OF THE PREFERRED EMBODIMENTS

Figure 1:
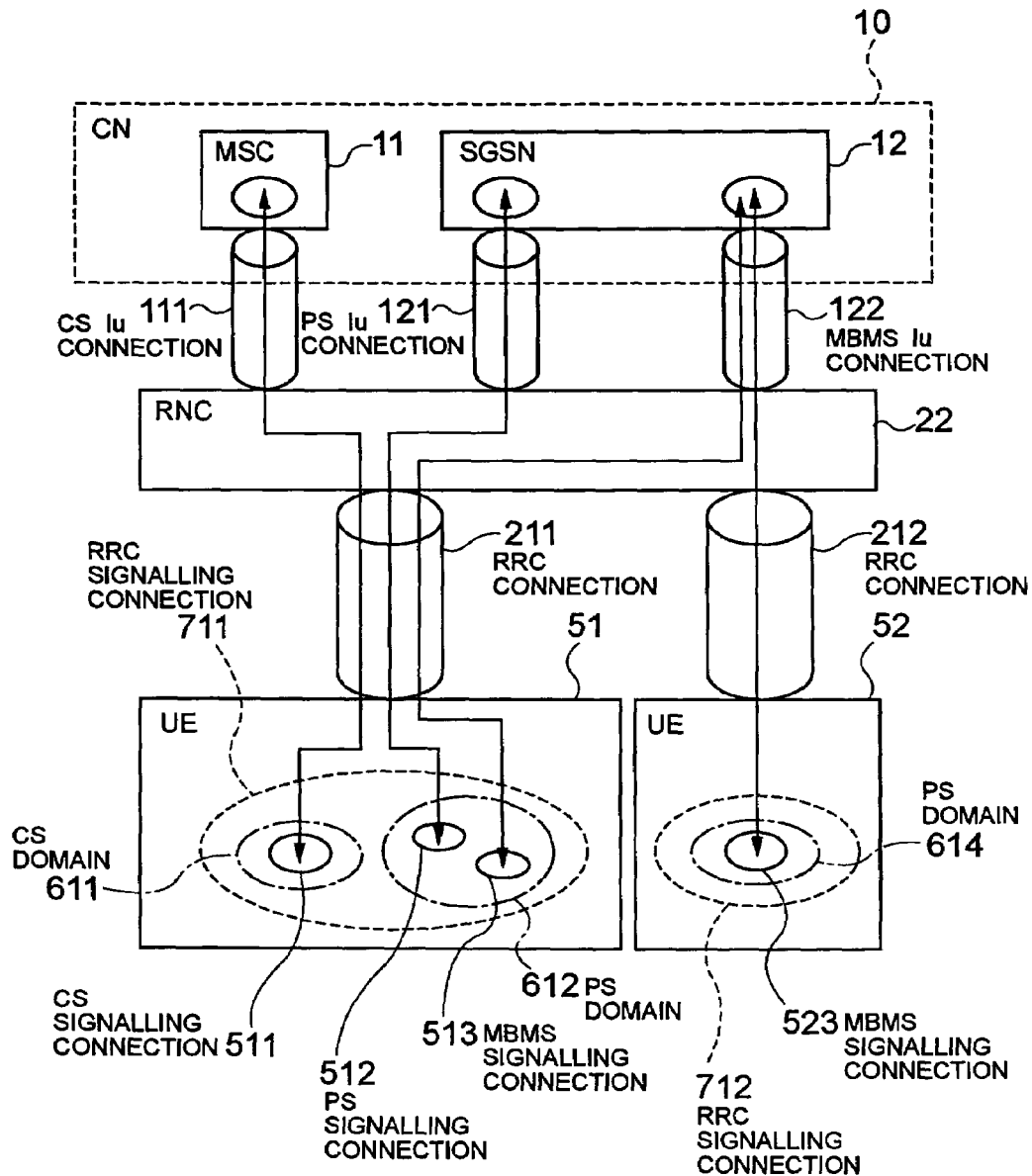
FIG. 1 is a schematic block diagram according to one embodiment of the present invention.
Figure 7:
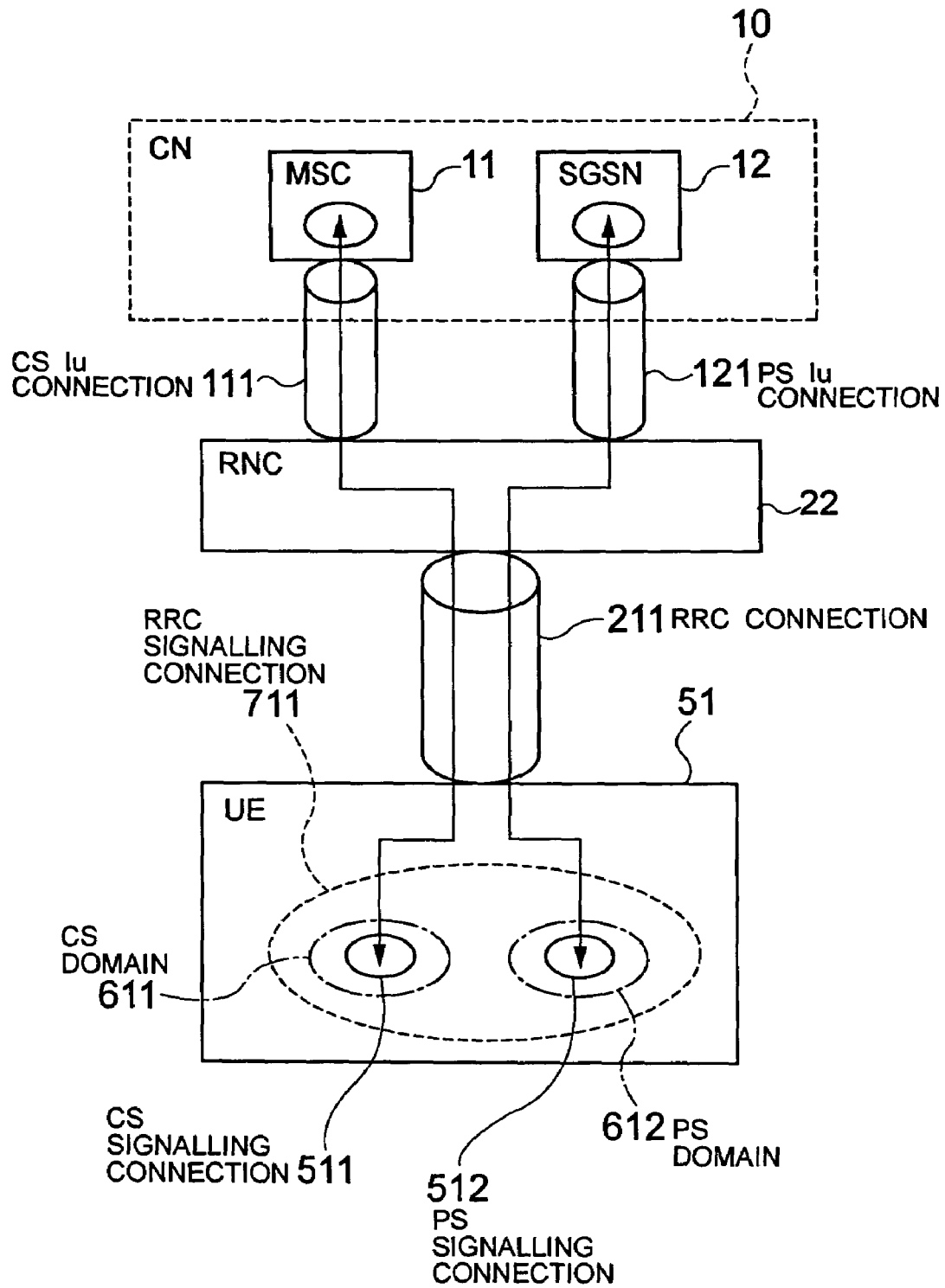
FIG. 7 is a schematic block diagram illustrating a conventional example.
Figure 8:
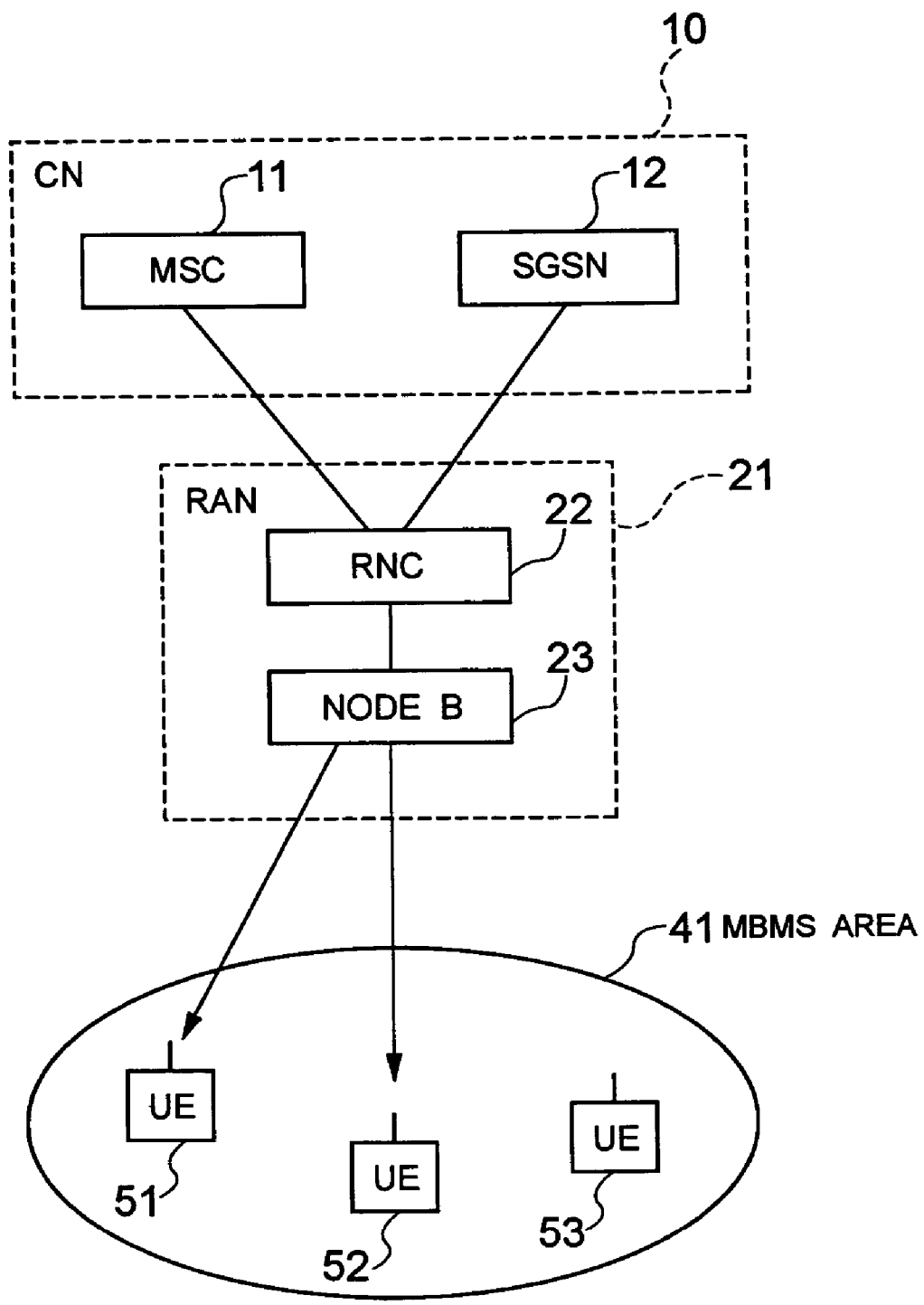
FIG. 8 is a schematic system diagram for the MBMS multicast service.

Embodiments of the present invention will be described below with reference to the accompanied drawings. FIG. 1 is a schematic diagram showing a system configuration according to one embodiment of the present invention, where the same reference numerals are allocated to the same components as those in FIGS. 7 to 9. It will be observed from FIG. 1 that a Core Network (CN) 10 includes an MSC 11 (defined as a CS domain) having a circuit switching function for voice communication and an SGSN (Serving GPRS (Global Packet Radio Service) Support Node) 12 (defined as a PS domain) having a packet switching function for packet data communication. The SGSN 12 is available for an existing packet service as well as the previously described new MBMS service (broadcast or multicast communication service supporting higher speed data communication as compared with the packet service), and mobile terminals 51 and 52 are available for the same as well.

These mobile terminals 51 and 52 are being present within coverage where MBMS information is distributed (see FIG. 8), and are now subscribing to the MBMS service.

A Radio Network Controller (RNC) 22 manages radio resources, controls a Node B (not shown) that is a radio base station, and the like. Between the Radio Network Controller 22 and each of the mobile terminals 51 and 52, RRC connections 211 and 212 are set, respectively. In the mobile terminal 51, a CS signalling connection 511 and a PS signalling connection 512 has already been established, and accordingly, as logical connections, a CS Iu connection 111 and a PS Iu connection 121 for the mobile terminal 51 are established on an Iu interface between the Core Network 10 and the Radio Network Controller 22. This enables the mobile terminal 51 to transmit/receive a message to/from the MSC 11 and the SGSN 12.

Furthermore in this embodiment, when the mobile terminal 51 attempts to receive the MBMS service, the PS Iu connection 121 is not used as the logical connection for the MBMS service but in place thereof, an MBMS Iu connection 122 dedicated to the MBMS service is independently established. On the mobile terminal 51 side, the PS signalling connection 512 and an MBMS signalling connection 513 are established in a PS domain 612. This allows the mobile terminal 51 to transmit/receive messages necessary for receiving the MBMS service to/from the SGSN 12.

At this time, if the other mobile terminal 52 attempts to receive the same MBMS service, the mobile terminal 52 shares the use of the MBMS Iu connection 122 which has already been established for the MBMS service intended for the mobile terminal 51. When still another mobile terminal attempts to receive the same MBMS service, this MBMS Iu connection 122 is shared among these three mobile terminals. Reference numeral 523 shown in the mobile terminal 52 denotes the MBMS signalling connection.

The MBMS Iu connection 122 shared with a plurality of mobile terminals handles only messages related to the MBMS service and is set as a signalling connection for each PS domain 612, 614.

In the MBMS multicast service, the following processings are executed. Among these are: so called "Joining" processing for notifying a network from the mobile terminal that it wishes to receive data in a multicast mode (it wishes to receive a service in a multicast mode or to subscribe to the service), "MBMS notification" processing for notifying that the multicast data is to be transferred, transfer processing for MBMS data, "Leaving" processing for leaving the multicast service, and the like.

Figure 2:
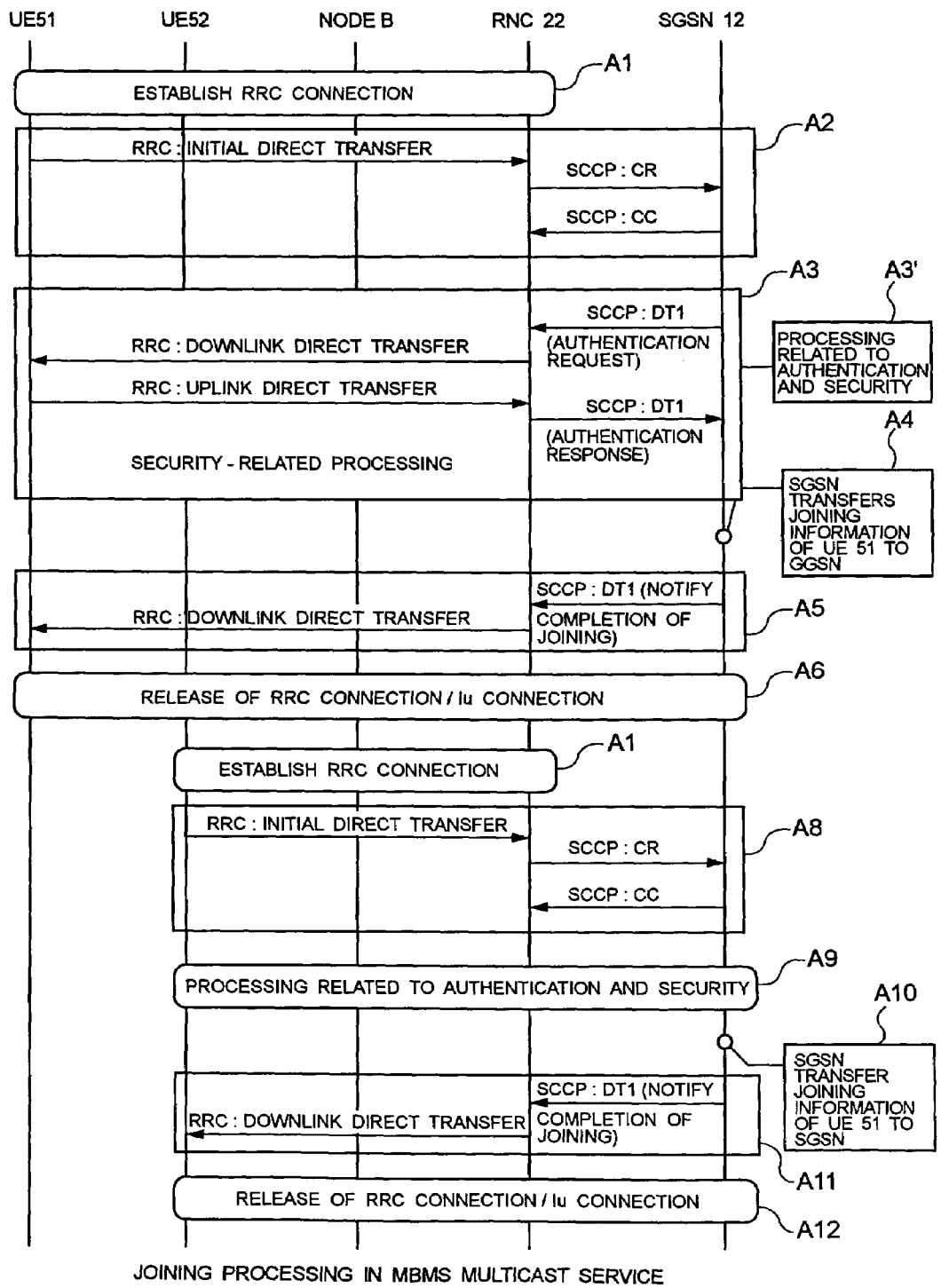
FIG. 2 is a sequence diagram partly showing processing for "Joining" in an MBMS multicast service according to the one embodiment of the present invention.
Figure 3:
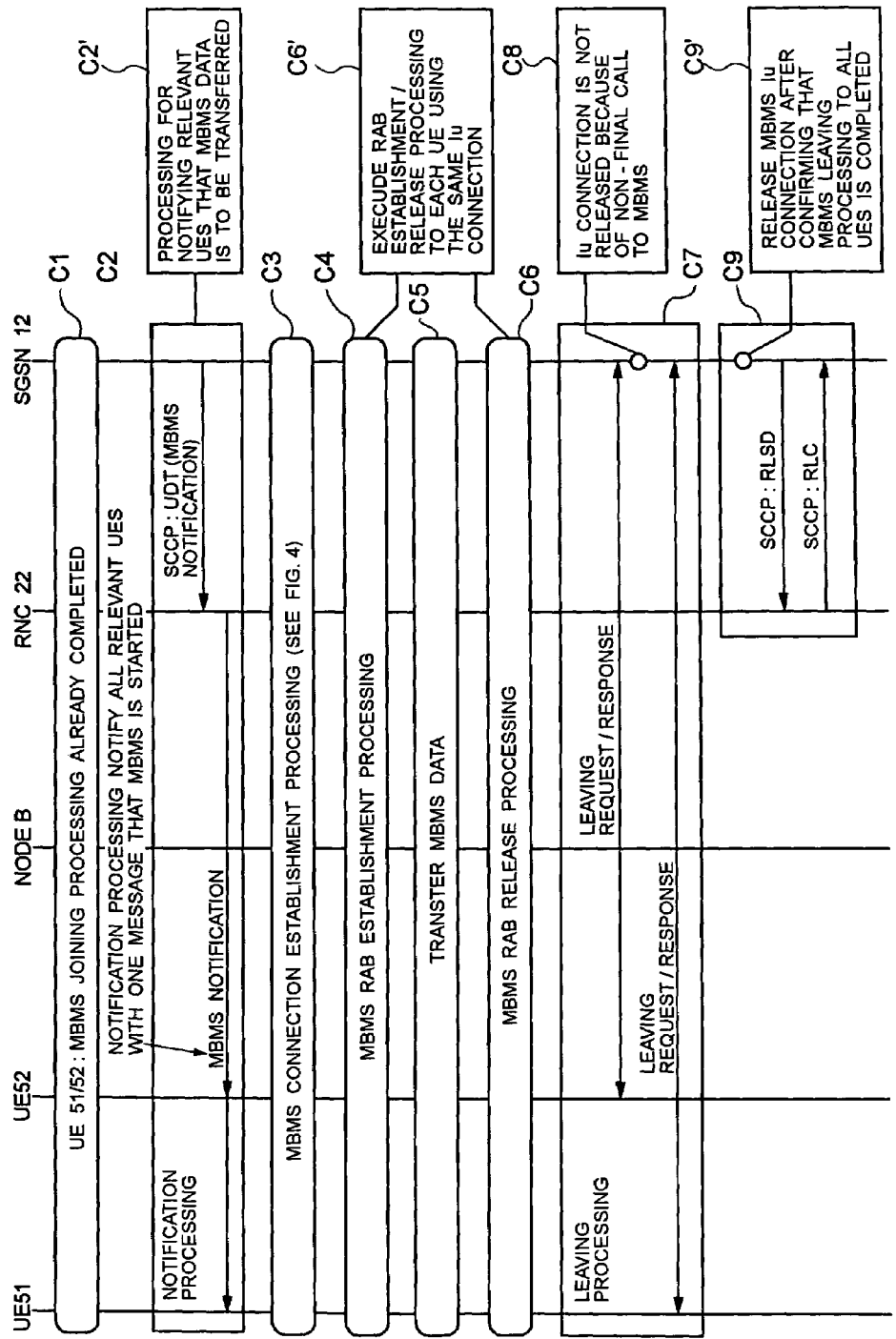
FIG. 3 is a sequence diagram showing data transfer and the processing for "Joining" in the MBMS multicast service according to the one embodiment of the present invention.
Figure 4:
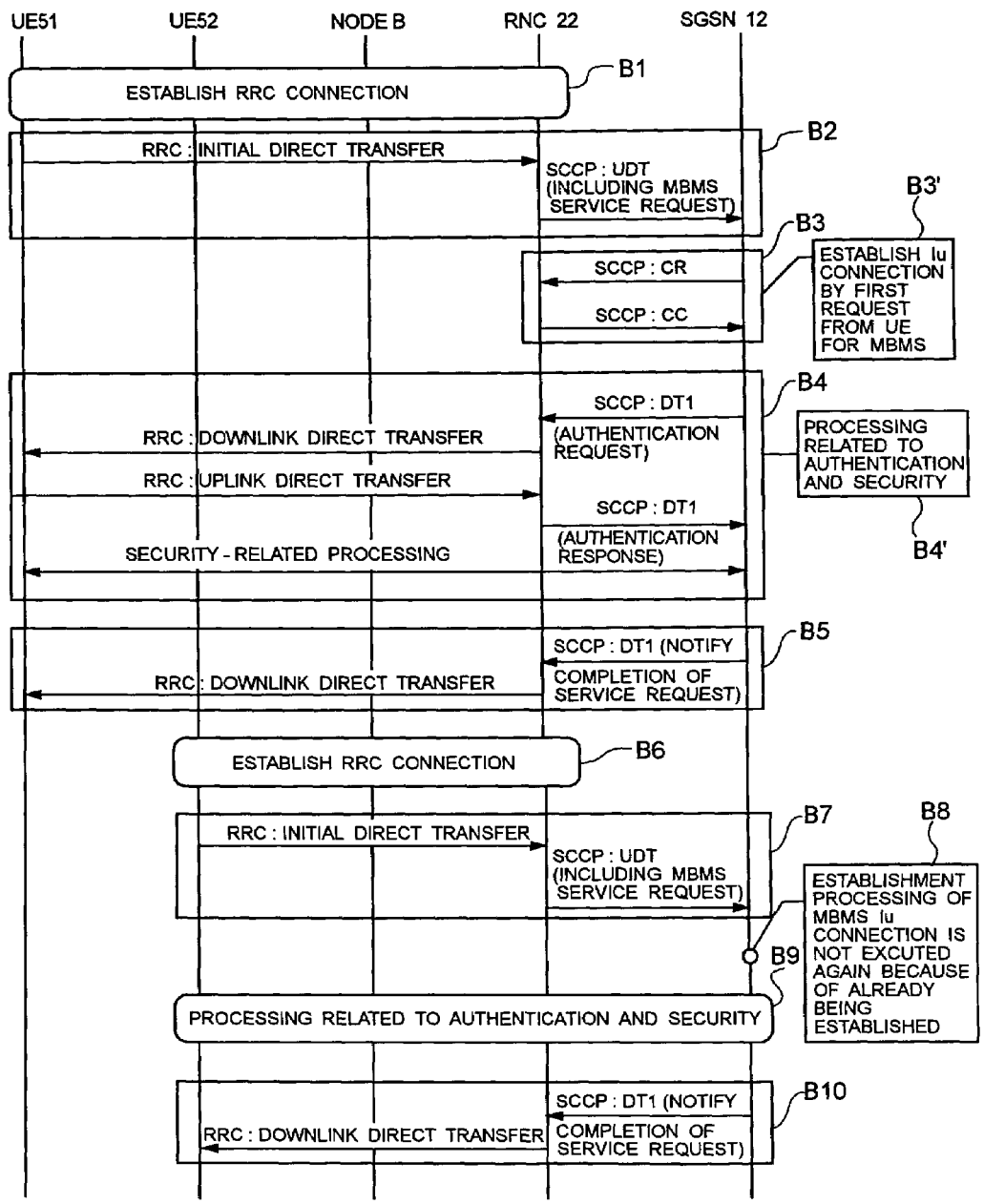
FIG. 4 is a sequence diagram showing detailed processing for a step C3 shown in FIG. 3.

Next, the entire operation in this embodiment will be described in further detail with reference to the sequence diagrams of FIGS. 2 to 4. In this embodiment, the "Joining" processing for the mobile terminal 51 is completed, and thereafter a "Joining" request from the other mobile terminal 52 is notified. FIG. 2 is a sequence diagram showing operations of the "Joining" processing, and FIGS. 3 and 4 are sequence diagrams showing operations of the data transfer and the "Leaving" processing. Steps described in rectangular boxes in the right ends in each drawing represent the processings executed in the SGSN 12. FIG. 4 is the diagram showing details of MBMS connection establishment processing (step C3) in the sequence of FIG. 3.

First, the mobile terminal 51 establishes the RRC connection with the Radio Network Controller 22 when triggered by turning-on operation of power supply and the like (step A1). Then, the mobile terminal 51 notifies the SGSN 12 of information about the "Joining". The Radio Network Controller 22 sends a connection establishment request to the SGSN 12 to establish the Iu connection therewith. Through this processing, the SGSN 12 recognizes that there exists a reception request of MBMS data from the mobile terminal 51 (step A2).

In step A2, a message "Initial Direct Transfer" is used to establish the signalling connection and, on radio communication it is used to transmit an initial NAS message (which is transmitted and received between the mobile terminal and the Core Network). In addition, "SCCP" is an abbreviation for "Signalling Connection Control Part" which means a signal system for efficiently transferring application signals and information, "CR" is an abbreviation for "Connection Request" which is used for a setting request of the signalling connection, and "CC" is an abbreviation for "Connection Confirm" which is a message notifying that the setting of the signalling connection has been executed.

Subsequently, the SGSN 12 executes authentication and security processing, and when ascertaining that the mobile terminal is an authorized terminal (steps A3, A3'), the SGSN 12 notifies an upper gateway (GGSN) which is not shown, of the "Joining" information of the mobile terminal 51, and also notifies the mobile terminal 51 that the "Joining" processing has been completed (steps A4, A5). Upon the completion of the "Joining" processing, the SGSN 12 releases once the Iu connection because the connection is not necessary until the transmission of MBMS data (step A6).

In step A3, "DT1" represents "Data Form 1" which is a message used to transmit various SCCP data (information about requests or responses for authentication, and the like) to an opposite node.

At this time, when the information of "Joining" is notified to the SGSN 12 from the mobile terminal 52 which has the established RRC connection since the power was turned on (step A7), the SGSN 12 executes, for the mobile terminal 52, the same processing as for the mobile terminal 51 (steps A8, A9), and when ascertaining that the mobile terminal 52 is an authorized terminal, the SGSN 12 notifies the gateway GGSN of the "Joining" information of the mobile terminal 52 and also reports the completion of the "Joining" processing to the mobile terminal 52 (steps A10, A11). Upon the completion of the "Joining processing", the SGSN 12 releases once the Iu connection (step A12). This interim connection release is performed because "MBMS notification" processing shown in FIG. 3 is not always executed immediately after the "Joining" processing and the SGSN 12 therefore efficiently assigns resources to users who receive other services until the execution of the "MBMS notification" processing.

After the completion of the "Joining" processing executed for each mobile terminal, the "MBMS notification" processing is executed to notify the MBMS service subscribing mobile terminals 51 and 52 that the MBMS data is to be transferred (steps C1, C2). At this time, a request message from the SGSN 12 to the Radio Network Controller 22 to transmit the "MBMS notification" to the mobile terminals is sent in a connectionless manner because the Iu connection is being released at the "Joining" processing. This request message to the Radio Network Controller 22 comprises only one message, but to the mobile terminals receiving the same MBMS service, such a request message may be transmitted simultaneously to a plurality of mobile terminals by using a group number indicative of a group receiving the same MBMS service. Note here that "UDT" is an abbreviation for "Unitdata" which is a message used to transmit data in a connectionless manner.

This group number is an identification number indicating each type of the MBMS service. Such identification numbers and the corresponding service types are pre-informed to many and unspecified mobile terminals from a system (a server providing the MBMS service), whereby the mobile terminal transmits to the SGSN 12 the identification number corresponding to the desired service type by containing it in the "Joining" information. This allows the SGSN 12 to recognize, based on the identification number included in the "Joining" information, which type of the MBMS service to provide for the mobile terminal which has transmitted the "Joining" request.

The mobile terminal 51 which has received the "MBMS notification" establishes the RRC connection again with the Radio Network Controller 22 for the reception of the MBMS service (step B1), and then in order to request the MBMS service, the Radio Network Controller 22 notifies the SGSN 12 in a connectionless manner that the message has been received by the mobile terminal 51 (step B2). Next, when the MBMS service request from the mobile terminal 51 is the first one out of a plurality of mobile terminals being present in the same MBMS area 41 (see FIG. 8), the SGSN 12 requests of the Radio Network Controller 22 to establish the Iu connection 122 (steps B3, B3'). This processing eliminates the need of establishing the Iu connection for each call to the MBMS service, thereby efficiently reducing an amount of messages. After this, the SGSN 12 executes authentication and security processing, and when ascertaining that the mobile terminal 51 is an authorized terminal, the SGSN 12 notifies the mobile terminal 51 of the completion of the MBMS service request (steps B4, B5).

At this time, when the information of the MBMS service request is notified to the SGSN 12 also from the mobile terminal 52 which has the established RRC connection (step B6) after the reception of the "MBMS notification", the Iu connection establishment request is not transmitted to the Radio Network Controller 22 because the MBMS Iu connection has already been established (steps B7, B8). The SGSN 12 executes authentication and security processing for the mobile terminal 52 in the same manner as for the mobile terminal 51, and when ascertaining that the mobile terminal 52 is an authorized terminal, the SGSN 12 notifies the mobile terminal 52 that the MBMS service request has been completed (steps B9, B10).

Since the Iu connection 122 is shared in the MBMS service, MBMS RAB establishment processing, MBMS data transfer, and MBMS RAB release processing to be performed after the data transfer, are executed using the same connection (steps C4, C4', C5, C6 and C6').

Next, when the MBMS data reception is no longer necessary, the "Leaving" processing is executed to leave the MBMS service (Step C7). In this processing, even when the "Leaving" processing is completed only in the mobile terminal 52, there is no need to execute the release processing of the Iu connection 122 because the mobile terminal 51 has not performed the "Leaving" processing (Step C8). When the "Leaving" processing is completed to all mobile terminals (mobile terminals 51 and 52) receiving the MBMS service in the end, the SGSN 12 releases the Iu connection 122 with the Radio Network Controller 22 to terminate the MBMS multicast service (Steps C9, C9').

In step C9, "RLSD" represents "Released" which is used to release the signalling connection and assigned resources, and "RLC" represents "Release Complete" which is used to notify the completion of the release.

Thus, the Iu connection 122 dedicated to the MBMS service is provided separately and independently from the PS Iu connection 121, so that an occurrence of contention between the MBMS service and other services (packet data communication) is eliminated, thus allowing the provision of the MBMS service without being conscious of other services, and particularly eliminating the need for checking into the signalling connection establishment status of other services.

Furthermore, the MBMS signalling connection is so designed that it is shared with a plurality of mobile terminals subscribing to the MBMS service, which enables transmission of a message using the group number (TMGI: Temporary mobile Group Identify) indicative of being a subscriber of the MBMS service without the need for transmitting the message individually to the mobile terminals using their respective identification numbers (IMSI: International Mobile Subscriber Identify). Furthermore, once the Iu connection 122 is established, there is no need to release it until all mobile terminals receiving the same MBMS service make "Leaving", thereby resulting in the reduced amount of messages transmitted between nodes.

Figure 5:
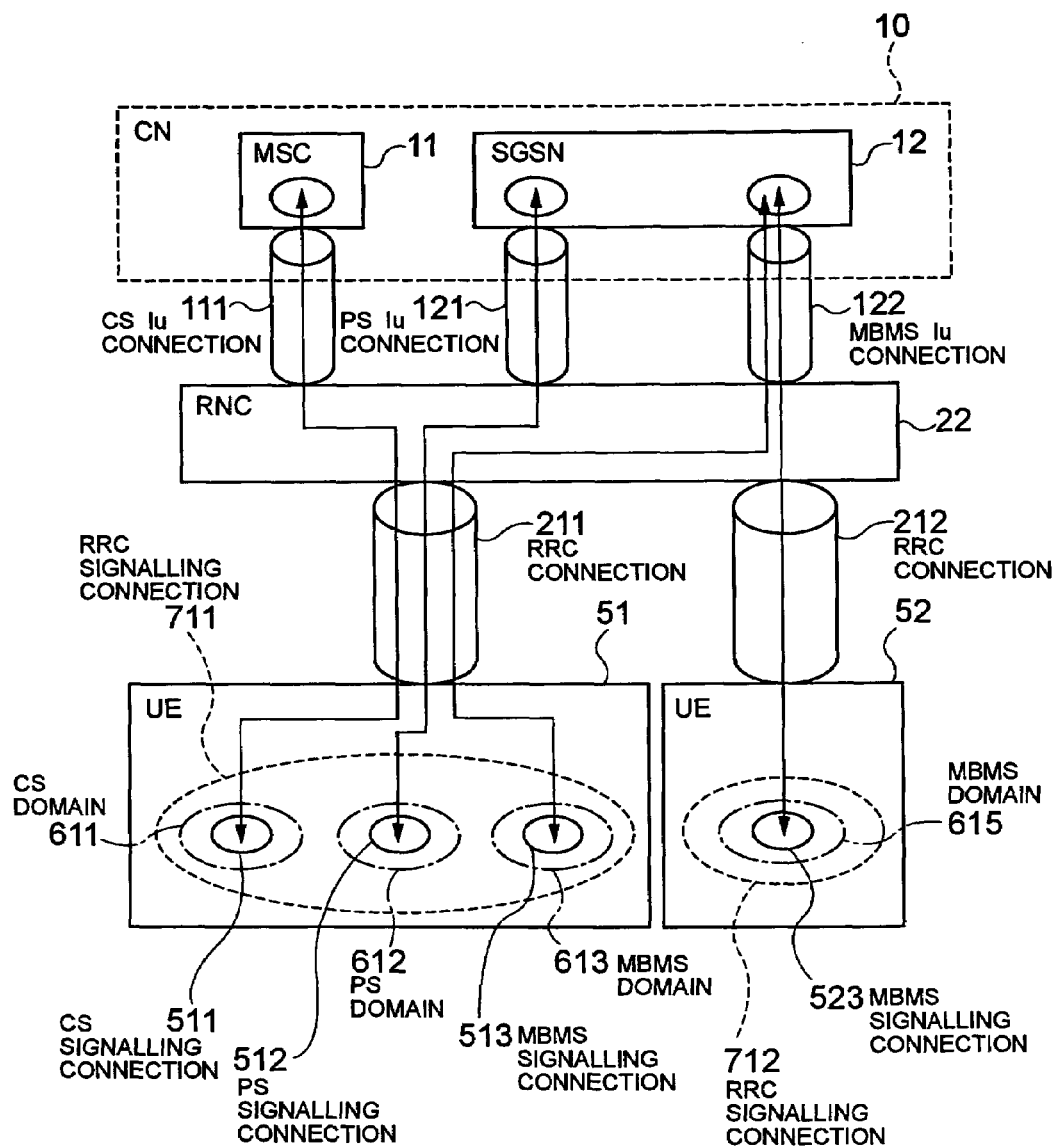
FIG. 5 is a schematic block diagram according to another embodiment of the present invention.

FIG. 5 is a schematic block diagram according to another embodiment of the present invention wherein the same reference numerals are allocated to the same components as those in FIG. 1. This embodiment differs from the embodiment shown in FIG. 1 in that among the three signalling connections established in the mobile terminal 51, the MBMS signalling connection 513 is established not in the PS domain 612 but in a newly provided MBMS domain 613.

This means that the difference resides only in the designation of domains in the mobile terminal that is performed when a message is sent from the Core Network 10 to the Radio Network Controller 22 upon the establishment of the RRC connection between the Radio Network Controller 22 and the mobile terminal, and other operations are the same as the operation sequences shown in FIGS. 2 to 4. In this embodiment, the signalling connections are established in respectively different domains, so that the management of the signalling connections in the mobile terminal is facilitated.

More specifically, the Core Network 10 manages different areas depending on domains in such a manner as to manage mobile terminal locations in the area called LA (Local Area) for the CS domain and to manage mobile terminal locations in the area called RA (Routing Area) for the PS domain. With the MBMS service, destination addresses of the MBMS information are managed in an area called an MBMS area which is not necessarily the same as the RA area of the PS domain. For example, when the existing PS signalling connection and the new MBMS signalling connection are managed in the same PS domain, as shown in FIG. 1, two areas need to be checked in one domain because location registration is required in response to an change in the MBMS area even when the RA as the PS domain remains the same.

To overcome this situation, the domain is divided into the PS domain 612 and an MBMS domain 613 as shown in FIG. 5 to thereby bring the domain and the management area thereof into a one-to-one correspondence, thus facilitating the management.

When some sort of failure occurs in the SGSN 12, the Radio Network Controller 22 needs to perform the releasing processing of the RRC signalling connection. This embodiment requires the transmission of an "RRC: Signalling Connection Release" message to each domain, however, the previous embodiment requires such transmission only once since the domains are not divided.

Figure 6:
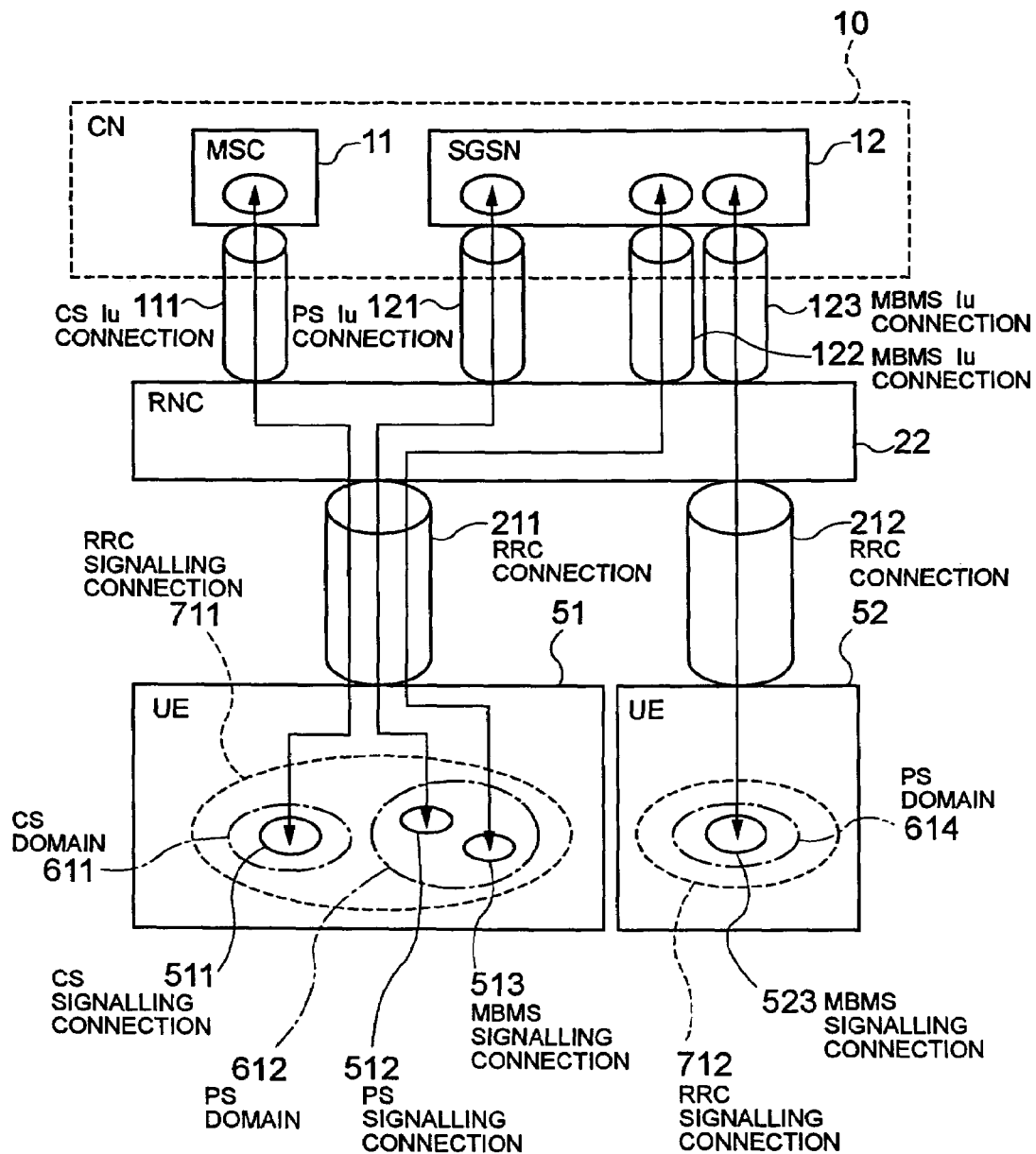
FIG. 6 is a schematic block diagram according to still another embodiment of the present invention.

FIG. 6 is a schematic block diagram according to still another embodiment of the present invention, wherein the same reference numerals are allocated to the same components as those in FIG. 1. In this embodiment, the configuration is identical to that in the FIG. 1 except that the MBMS Iu connections 122 and 123 for the MBMS signalling connections are provided so as to correspond to each mobile terminal. The establishment processing and release processing of these Iu connections 122 and 123 are executed by the SGSN 12 independently to each mobile terminal, while the MBMS signalling connection is provided separately from the PS Iu connection 121 for the PS signalling connection, therefore an occurrence of contention with different services and the processing complexity in the SGSN may be eliminated.

In this embodiment shown in FIG. 6, since different Iu connections are established to each mobile terminal, the same message needs to be transmitted to a plurality of specified mobile terminals, which raises the possibility to cause congestion induced by a plurality of messages transmitted on radio communication and to adversely affect the processing capability due to the increased amount of the messages to be processed between the nodes. In the embodiment shown in FIG. 1, however, the Iu connection is established which is common to a plurality of mobile terminals, thereby eliminating an occurrence of congestion induced by the large amount of messages transmitted on radio communication and also eliminating adverse effects to the processing capability between the nodes.

Note here that it is obvious that the embodiment shown in FIG. 5 is applicable to that shown in FIG. 6.

It is of course understood that the operation in the above described embodiments may be programmed as operation procedures and stored in a recording medium capable of being read by a computer (CPU), and that the computer reads the recording medium and sequentially executes the operation procedures to thereby realize the operation.

As described above, according to the present invention, the Iu connection for the MBMS service is provided separately from the PS Iu connection, so that the occurrence of contention between the MBMS service and other services (Packet data service) is eliminated, thereby allowing the provision of the MBMS service without being conscious of other services, and particularly providing an effect that it is no longer necessary to check into establishment statuses of signalling connections of other services.

What is claimed is:

1. A mobile communication system including a core network having a node with a packet switching function for packet data communication, a radio network controller, and a mobile terminal, wherein a Signaling Connection Control Part (SCCP) signaling connection for the packet data communication and a broadcast or multicast service is set on an interface between the radio network controller and the core network, the mobile communication system further comprising:

connection setting means for setting the SCCP signaling connection between the radio network controller and the core network for multicast data communication separately from the SCCP signaling connection for the packet data communication, wherein, said radio network controller initiates the SCCP signaling connection for the packet data communication, and said core network initiates the SCCP signaling connection for the broadcast or multicast service.

2. The mobile communication system according to claim 1, wherein the connection setting means sets the connection for the multicast data communication in common to a plurality of mobile terminals that attempt to receive a service of the multicast data communication.

3. The mobile communication system according to claim 2, wherein the connection setting means sets the connection for the multicast data communication in response to a service receiving request from a first mobile terminal attempting to receive the multicast data communication service.

4. The mobile communication system according to claim 2, further comprising:

a first connection releasing means for releasing the connection for the multicast data communication in response to a service leaving request from a last mobile terminal receiving the multicast data communication service.

5. The mobile communication system according to claim 1, wherein the connection setting means sets the connection for the multicast data communication individually to each of the plurality of the mobile terminals that attempt to receive the multicast data communication service.

6. The mobile communication system according to claim 5, further comprising:

a second connection releasing means for, in response to a multicast data communication service leaving request from each of the plurality of mobile terminals, releasing the connection for the multicast data communication corresponding to the mobile terminal.

7. The mobile communication system according to claim 1, wherein the connection for the multicast data communication in the mobile terminal is managed in a PS (Packet Switching) domain including an area for the packet switching function in the core network.

8. The mobile communication system according to claim 1, wherein the connection for the multicast data communication in the mobile terminal is managed in a domain dedicated to the multicast data communication which is different from a PS (Packet Switching) domain including the area for the packet switching function in the core network.

9. A method of controlling operations in a mobile communication system including a core network having a node with a packet switching function for packet data communication, a radio network controller, and a mobile terminal, wherein a Signaling Connection Control Part (SCCP) signaling connection for the packet data communication and a broadcast or multicast service is set on an interface between the radio network controller and the core network, the method comprising:

setting the SCCP signaling connection between the radio network controller and the core network for multicast data communication separately from the SCCP signaling connection for the packet data communication, wherein, the radio network controller initiates the SCCP signaling connection for the packet data communication, and the core network initiates the SCCP signaling connection for the broadcast or multicast service.

10. The method according to claim 9, wherein the setting the connection for multicast data communication includes setting the connection for the multicast data communication in common to a plurality of mobile terminals that attempt to receive a service of the multicast data communication.

11. The method according to claim 10, wherein the setting the connection for multicast data communication includes setting the connection for the multicast data communication in response to a service receiving request from a first mobile terminal attempting to receive the multicast data communication service.

12. The method according to claim 10, further comprising:
a first connection releasing step of releasing the connection for the multicast data communication in response to a service leaving request from a last mobile terminal receiving the multicast data communication service.

13. The method according to claim 9, wherein the setting the connection for multicast data communication includes setting the connection for the multicast data communication individually to each of a plurality of the mobile terminals that attempt to receive the multicast data communication service.

14. The method according to claim 13, further comprising:
a second connection releasing step of, in response to a multicast data communication service leaving request from each of the plurality of mobile terminals, releasing the connection for the multicast data communication corresponding to the mobile terminal.

15. A node in a mobile communication system including a core network having a node with a packet switching function for packet data communication, a radio network controller, and a mobile terminal, wherein a Signaling Connection Control Part (SCCP) signaling connection for the packet data communication and a broadcast or multicast service is set on an interface between the node network and the radio network controller, the node in the mobile communication system further comprising:

connection setting means for setting the SCCP signaling connection between the radio network controller and the core network for multicast data communication from the SCCP signaling connection for the packet data communication, wherein, said radio network controller initiates the SCCP signaling connection for the packet data communication, and said core network initiates the SCCP signaling second connection for the broadcast or multicast service.

16. The node according to claim 15, wherein the connection setting means sets the connection for the multicast data communication in common to a plurality of mobile terminals that attempt to receive a service of the multicast data communication.

17. The node according to claim 16, wherein the connection setting means sets the connection for the multicast data communication in response to a service receiving request from a first mobile terminal attempting to receive the multicast data communication service.

18. The node according to claim 16, further comprising:
a first connection releasing means for releasing the connection for the multicast data communication in response to a service leaving request from a last mobile terminal receiving the multicast data communication service.

19. The node according to claim 15, wherein the connection setting means sets the connection for the multicast data communication individually to each of the plurality of the mobile terminals that attempt to receive the multicast data communication service.

20. The node according to claim 19, further comprising:
a second connection releasing means for, in response to the multicast data communication service leaving request from each of the plurality of mobile terminals, releasing the connection for the multicast data communication corresponding to the mobile terminal.

21. A computer-readable medium encoded with a set of machine-executable instructions for making a computer execute operation controlling of a node in a mobile communication system including a core network having a node with a packet switching function for packet data communication, a radio network controller, and a mobile terminal, wherein a Signaling Connection Control Part (SCCP) signaling connection for the packet data communication and a broadcast or multicast service is set on an interface between the radio network controller and the core network, the program comprising:

setting the SCCP signaling connection between the radio network controller and the core network for multicast data communication separately from the SCCP signaling connection for the packet data communication, wherein, the radio network controller initiates the SCCP signaling connection for the packet data communication, and the core network initiates the SCCP signaling connection for the broadcast or multicast service.

22. The computer-readable medium according to claim 21, wherein setting the connection for multicast data communication includes setting the connection for the multicast data communication in connection to a plurality of mobile terminals that attempt to receive a service of the multicast data communication.

23. The computer-readable medium according to claim 22, wherein setting the connection for multicast data communication includes setting the connection for the multicast data communication in connection to a service receiving request from a first mobile terminal attempting to receive the multicast data communication service.

24. The computer-readable medium according to claim 22, further comprising:
a first connection releasing step of releasing the connection for the multicast data communication in response to a service leaving request from a last mobile terminal receiving the multicast data communication service.

25. The computer-readable medium according to claim 21, wherein the setting the connection for multicast data communication includes setting the connection for the multicast data communication individually to each mobile terminal of a plurality of the mobile terminals that attempt to receive a service of the multicast data communication service.

26. The computer-readable medium according to claim 25, further comprising:
a second connection releasing step of, in response to a multicast data communication service leaving request from each of the plurality of mobile terminals, releasing the connection for the multicast data communication corresponding to the mobile terminal.

27. A mobile communication system, comprising:
a core network for packet switching; and
a radio network controller which initiates a request for Signaling Connection Control Part (SCCP) signaling connection to said core network to set on an interface with said core network,
wherein, if a request is related to multimedia broadcast multicast service, said core network initiates a request for SCCP signaling connection to said radio network controller, instead of the request being initiated from said radio network controller.

28. The mobile communication system claimed in claim 27, wherein a single signaling connection initiated for said multimedia broadcast multicast service is shared among a plurality of mobile terminals which receive a common multimedia broadcast multicast service.

29. The mobile communication system claimed in claim 28, wherein said single signaling connection for said multimedia broadcast multicast service is separately initiated from a signaling connection for a packet service which is not said multimedia broadcast multicast service.

30. The mobile communication system claimed in claim 28, wherein, when said single signaling connection for said multimedia broadcast multicast service is set and another mobile terminal requests for receiving said multimedia broadcast multicast service, the other mobile terminal receives said multimedia broadcast multicast service by using said single signaling connection.

31. The mobile communication system claimed in claim 30, wherein said core network releases said single signaling connection for said multimedia broadcast multicast service in response to a multimedia broadcast multicast service leaving request from a last mobile terminal receiving said multimedia broadcast multicast service.

32. The mobile communication system claimed in claim 30, wherein, in response to a multimedia broadcast multicast service leaving request from each of said plurality of mobile terminals, said core network releases the signaling connection for said multimedia broadcast multicast service corresponding to the mobile terminal.

33. A method of controlling operation in a mobile communication system including a core network for packet switching, and a radio network controller which initiates a request for a Signaling Connection Control Part (SCCP) signaling connection to said core network to set on an interface with said core network, the method comprising:
if a request is related to a multimedia broadcast multicast service, initiating a request for said SCCP signaling connection to said radio network controller, instead of initiating the request from said radio network controller.

34. The method claimed in claim 33, wherein said initiating a request includes setting a single signaling connection initiated for said multimedia broadcast multicast service to be shared among a plurality of mobile terminals those of which receive a common multimedia broadcast multicast service.

35. The method claimed in claim 34, wherein said initiating includes setting said single signaling connection for said multimedia broadcast multicast service to be separately initiated from a signaling connection for a packet service which is not said multimedia broadcast multicast service.

36. The method claimed in claim 34, wherein, when said single signaling connection for said multimedia broadcast multicast service is set and there are other mobile terminal requests for receiving said multimedia broadcast multicast service, the other mobile terminals receive said multimedia broadcast multicast service by using said single signaling connection.

37. The method claimed in claim 36, further comprising:
releasing said single signaling connection for said multimedia broadcast multicast service in response to a multimedia broadcast multicast service leaving request from a last mobile terminal receiving said multimedia broadcast multicast service.

38. The method claimed in claim 36, further comprising:
in response to a multimedia broadcast multicast service leaving request from each of said plurality of mobile terminals, releasing the signaling connection for said multimedia broadcast multicast service corresponding to the mobile terminal.

39. A core network for a mobile communication system, comprising:
an SGSN (Serving GPRS (Global Packet Radio Service) Support Node) to configure the core network and a radio network controller that is interconnected to said core network in said mobile communication system for a packet switching, said radio network controller initiating a request for a Signaling Connection Control Part (SCCP) signaling connection to said core network to set on an interface with said core network,
wherein, if a request is related to a multimedia broadcast multicast service, said core network initiates a request for the SCCP signaling connection to said radio network controller, instead of a request from said radio network controller.

40. The core network claimed in claim 39, wherein a single signaling connection initiated for said multimedia broadcast multicast service is shared among a plurality of mobile terminals which receive a common multimedia broadcast multicast service.

41. The core network claimed in claim 40, wherein said single signaling connection for said multimedia broadcast multicast service is separately initiated from a signaling connection for A packet service which is not said multimedia broadcast multicast service.

42. The core network claimed in claim 40, wherein, when said single signaling connection for said multimedia broadcast multicast service is set and there are other mobile terminal requests for receiving said multimedia broadcast multicast service, the other mobile terminals receive said multimedia broadcast multicast service by using said single signaling connection.

43. The core network claimed in claim 42, wherein said core network releases said single signaling connection for said multimedia broadcast multicast service in response to a multimedia broadcast multicast service leaving request from a last mobile terminal receiving said multimedia broadcast multicast service.

44. The core network claimed in claim 42, wherein, in response to a multimedia broadcast multicast service leaving request from each of said plurality of mobile terminals, said core network releases the signaling connection for said multimedia broadcast multicast service corresponding to the mobile terminal.

45. A mobile communications system comprising:
a mobile terminal;
a core network for packet switching; and
a radio network controller to control a radio network, wherein a first Signaling Connection Control Part (SCCP) signaling connection for said mobile terminal and a second SCCP signaling connection for a broadcast or multicast service are set on an interface between said core network and said radio network controller,
said radio network controller initiates said first SCCP signaling connection for said mobile terminal, said core network initiates said second SCCP signaling connection for the broadcast or multicast service, and
said second SCCP signaling connection is set separately from said first SCCP signaling connection.

46. The mobile communications system according to claim 45, wherein said mobile terminal comprises one of a plurality of mobile terminals, and
wherein said second signaling connection is shared among said plurality of mobile terminals.

47. The mobile communications system according to claim 46, wherein said second signaling connection is set in response to a joining request from one of said plurality of mobile terminals when none of said plurality of mobile terminals initially do not receive said second communications service.

48. The mobile communications system according to claim 46, wherein said second signaling connection is released in response to a leaving request from one of said plurality of mobile terminals when only said one of said plurality of mobile terminals receive said second communications service.

49. The mobile communications system according to claim 45, wherein said broadcast or multicast service comprises a multimedia broadcast multicast service (MBMS).

50. The mobile communications system according to claim 45, wherein said first signaling connection comprises a PS Iu connection.

51. A mobile communications method used in a mobile communications system having a mobile terminal, a core network for packet switching and a radio network controller to control a radio network, comprising:
   setting a first Signaling Connection Control Part (SCCP) signaling connection for said mobile terminal on an interface between said core network and said radio network controller; and
   setting a second SCCP signaling connection for a broadcast or multicast service separately from said first SCCP signaling connection on said interface, wherein
   the radio network controller initiates said first SCCP signaling connection for said mobile terminal, and
   the core network initiates said second SCCP signaling connection for the broadcast or multicast service.

52. The mobile communications method according to claim 51, wherein said mobile communications system comprises a plurality of mobile terminals including said mobile terminal and said second signaling connection is shared among said plurality of mobile terminals.

53. The mobile communications method according to claim 52, wherein said second signaling connection is set in response to a joining request from one of said plurality of mobile terminals when none of said plurality of mobile terminals do not receive said second communications service.

54. The mobile communications method according to claim 52, further comprising:
   releasing said second signaling connection in response to a leaving request from one of said plurality of mobile terminals when only said one of said plurality of mobile terminals receive said second communications service.

55. The mobile communications method according to claim 51, wherein said broadcast or multicast service comprises a multimedia broadcast multicast service (MBMS).

56. The mobile communications method according to claim 51, wherein said first signaling connection comprises a PS Iu connection.

57. A mobile communications system comprising:
   a mobile terminal;
   a core network for packet switching; and
   a radio network controller to control a radio network,
   wherein a first Signaling Connection Control Part (SCCP) signaling connection for said mobile terminal and a second SCCP signaling connection for a broadcast or multicast service is set on an interface between said core network and said radio network controller,
   said radio network controller initiates the first SCCP signaling connection for said mobile terminal, and
   said core network initiates a request for said second SCCP signaling connection to said radio network controller.

58. A mobile communications system comprising:
   a mobile terminal;
   a core network for packet switching; and
   a radio network controller to control a radio network,
   wherein a first Signaling Connection Control Part (SCCP) signaling connection for said mobile terminal and second SCCP signaling connection for a broadcast or multicast service are set on an interface between said core network and said radio network controller,
   said radio network controller initiates the first SCCP signaling connection for said mobile terminal,
   said core network comprises an SGSN (Serving GPRS (Global Packet Radio Service) Support Node), and
   wherein said SGSN manages said second SCCP signaling connection.

59. A mobile communications method used in a mobile communications system having a core network for packet switching and a radio network controller to control a radio network, comprising:
   a step of setting a first Signaling Connection Control Part (SCCP) signaling connection for a first communications service on an interface between said core network and said radio network controller; and
   a step of setting a second SCCP signaling connection for a second communications service and said core network initiates a request for said second SCCP signaling connection to said radio network controller.

60. A mobile communication method used in a mobile communications system having a mobile terminal, a core network for packet switching and a radio network controller to control a radio network, comprising:
   setting a first Signaling Connection Control Part (SCCP) signaling connection for said mobile terminal on an interface between said core network and said radio network controller; and
   setting a second SCCP signaling connection for a broadcast or multicast service on said interface,
   wherein the radio network controller initiates said first SCCP signaling connection for said mobile terminal, and
   said core network comprises a SGSN (Serving GPRS (Global Packet Radio Service) Support Node), and said SGSN manages said second SCCP signaling connection.

* * * * *